United States Patent
Avital et al.

(10) Patent No.: US 9,282,073 B1
(45) Date of Patent: Mar. 8, 2016

(54) E-MAIL ENHANCEMENT BASED ON USER-BEHAVIOR

(71) Applicant: KNOWMAIL S.A.L LTD, Yokneam Illit (IL)

(72) Inventors: Oded Avital, Ganey Tiqua (IL); Avi Mandelberg, Hod Hasharon (IL); Shmuel Ur, Shorashim (IL)

(73) Assignee: KNOWMAIL S.A.L LTD, Yokneam Illit (IL)

( * ) Notice: Subject to any disclaimer, the term of this patent is extended or adjusted under 35 U.S.C. 154(b) by 0 days.

(21) Appl. No.: 14/866,929

(22) Filed: Sep. 26, 2015

Related U.S. Application Data

(60) Provisional application No. 62/114,612, filed on Feb. 11, 2015, provisional application No. 62/114,624, filed on Feb. 11, 2015.

(51) Int. Cl.
*G06F 15/16* (2006.01)
*H04L 12/58* (2006.01)

(52) U.S. Cl.
CPC ............... *H04L 51/26* (2013.01); *H04L 51/02* (2013.01)

(58) Field of Classification Search
USPC ......... 709/203, 206, 217, 219, 223, 224, 240; 715/752; 711/161
See application file for complete search history.

(56) References Cited

U.S. PATENT DOCUMENTS

| 7,882,191 | B2 * | 2/2011 | Sood | G06Q 10/10 709/206 |
| 8,095,613 | B1 * | 1/2012 | Perkowitz | G06Q 10/109 709/206 |
| 8,935,347 | B2 * | 1/2015 | Cohen | H04L 12/587 709/206 |
| 9,059,947 | B2 * | 6/2015 | Tysowski | H04L 51/14 |
| 2003/0014490 | A1 * | 1/2003 | Bates | G06Q 10/107 709/206 |
| 2008/0126951 | A1 * | 5/2008 | Sood | H04L 51/26 715/752 |
| 2014/0229853 | A1 * | 8/2014 | Cho | G06Q 10/20 715/752 |
| 2014/0337590 | A1 * | 11/2014 | Lemus | G06F 12/00 711/161 |
| 2015/0339627 | A1 * | 11/2015 | Brunner | G06Q 10/10 705/345 |

* cited by examiner

*Primary Examiner* — Quang N Nguyen
(74) *Attorney, Agent, or Firm* — The Law Office of Joseph L. Felber

(57) ABSTRACT

A computer-implemented method, a computer program product and a computerized apparatus, the method comprising: receiving a communication message transmitted to a user and at least one other recipient; providing to the user a display of a set of communication messages comprising the communication message; after said providing, receiving information of actions related to the communication message performed by the at least one other recipient of the communication message; scoring the communication message based on the actions to obtain a priority; and modifying the display based on the priority, whereby the display is modified dynamically upon an additional action of the at least one of the other recipients of the communication message.

7 Claims, 5 Drawing Sheets

E-MAIL ENHANCEMENT BASED ON USER-BEHAVIOR

CROSS-REFERENCE TO RELATED APPLICATION

This application claims the benefit of U.S. Provisional Application No. 62/114,624 filed Feb. 11, 2015, entitled Method for User Actions Tracking Via Emails Analysis, and of U.S. Provisional Application No. 62/092,287 filed Dec. 16, 2014, entitled Method for Rating Emails Based on the Way Other People React to Those Emails, which are hereby incorporated by reference in their entirety without giving rise to disavowment.

TECHNICAL FIELD

The present disclosure relates to e-mail systems in general, and to enhancing e-mail performance within an organization, in particular.

BACKGROUND

Electronic mail, commonly referred to as email, e-mail or simply mail is a method of exchanging digital messages from an author to one or more recipients.

Current mail systems are mostly client-server based. A mail server is an application that receives e-mail messages from e-mail clients, or from other mail servers. A mail server usually comprises a list of users, a storage area, a set of user definable rules, and a series of communication modules. The storage area is where received mail messages are stored for local users, and where messages in transit to another destination are temporarily stored. It usually takes the form of a database of information. The user defined rules determine how the mail server should react when determining the destination of a specific message, or possibly react to the sender of the message. For example: specific e-mail addresses can be barred, or certain users can be restricted to only sending messages within the company. The list of users is a database of user accounts that the mail server recognizes and will deal with locally, and the communications modules are components that actually handle the transfer of messages to and from other mail servers and e-mail clients. Depending upon the requirements of the mail server, a number of different modules may be installed and used by the server.

A mail client is an application, used by users for reading, writing, sending and receiving e-mail messages. A mail client may be installed on a user's computing platform, but may additionally or alternatively be implemented as a web page accessed for example using a browser. The client usually comprises an editor, an address book, a folder collection or hierarchy in which messages may be stored, and communications modules. The address book allows users to store commonly used e-mail addresses in an easy to get at format, reducing the chance of addressing errors.

A mail system implemented within an organization usually consists of one or more mail servers, each connected to a multiplicity of clients, each client associated with a user or another entity within the organization, such as an employee, a group of employees, a resource such as a room, or the like.

In normal operation mode, a client composes a mail message addressed to one or more addressees. Zero, one or more of the addressees may be from the same organization, i.e., connected to the same mail server, and zero, one or more may be external to the organization. After composing the mail, it is being sent and distributed by the mail server to the internal addressees, if any, or to one or more external mail servers for distribution to the external addressees, if any.

Also in normal operation mode, a client receives e-mail messages from users within the organization or external to the organization. The user may view the received or sent mails, and may order them in accordance with predetermined parameters, such as receipt date and time, sender, subject, or the like.

BRIEF SUMMARY

One exemplary embodiment of the disclosed subject matter is a computer-implemented method comprising: receiving a communication message transmitted to a user and one or more other recipients; providing to the user a display of a set of communication messages comprising the communication message; after said providing, receiving information of actions related to the communication message performed by the one or more of the other recipients of the communication message; scoring the communication message based on the actions to obtain a priority; and modifying the display based on the priority, whereby the display is modified dynamically upon an additional action of the other recipient of the communication message. Within the method, one or more of the actions performed by the other recipient is optionally selected from the group consisting of: reading the communication message; filing the communication message; replying to the communication message, forwarding the communication message and deleting the communication message. Within the method, the priority is optionally based also on a factor selected from the group consisting of: a time slot available to the user to review the communication message; a sender of the communication message; a length of the communication message; and a subject of the communication message. Within the method, the user is optionally associated with an organization, and wherein the other recipient is associated with the organization. Within the method, said scoring is optionally also based a model associated with the user, wherein the model is determined based on past actions by the user when receiving communication messages. Within the method, the user is optionally associated with an organization; wherein the method further comprising publishing, exclusively within the organization, the model to be used for one or more users of the organization, without providing the one or more users direct access to the model.

Another exemplary embodiment of the disclosed subject matter is a computer program product comprising a computer readable storage medium retaining program instructions, which program instructions when read by a processor, cause the processor to perform the above method.

Yet another exemplary embodiment of the disclosed subject matter is a computer-implemented method comprising: obtaining a model related to a multiplicity of users of a communication system within an organization; receiving a suggested communication message composed by a user of the multiplicity of users, and addressed to one or more recipients; and sending the communication message to the at least one recipient in a different manner than an original manner selected by the user. Within the method, the different manner is optionally selected from the group consisting of: a different transmission time than an original transmission time set by the user; a different communication channel than an original communication channel; and a different medium than a medium of the original channel. Within the method, sending the communication message in a different manner is optionally subject to an approval by the user. Within the method, the user's approval may be general or specific to the communication message. Within the method, sending the communication message in a different manner is optionally subject to system choice. The method may further comprise a training step for determining the model. The method may further comprise publishing a model of one or more users.

Yet another exemplary embodiment of the disclosed subject matter is a computer program product comprising a computer readable storage medium retaining program instructions, which program instructions when read by a processor, cause the processor to perform the above method.

Yet another exemplary embodiment of the disclosed subject matter is a computerized apparatus having a processor, the processor being adapted to perform the above method.

Yet another exemplary embodiment of the disclosed subject matter is a computerized apparatus having a processor, the processor being adapted to perform the steps of: receiving a communication message transmitted to a user and at least one other recipient; providing to the user a display of a set of communication messages comprising the communication message; after said providing, receiving information of actions related to the communication message performed by the at least one other recipient of the communication message; scoring the communication message based on the actions to obtain a priority; and modifying the display based on the priority, whereby the display is modified dynamically upon an additional action of the at least one of the other recipients of the communication message. Within the apparatus, one or more of the actions performed by the other recipient is optionally selected from the group consisting of: reading the communication message; filing the communication message; replying to the communication message, forwarding the communication message and deleting the communication message. Within the apparatus, the priority is optionally based also on a factor selected from the group consisting of: a time slot available to the user to review the communication message; a sender of the communication message; a length of the communication message; and a subject of the communication message. Within the apparatus, said scoring is optionally also based a model associated with the user, wherein the model is determined based on past actions by the user when receiving communication messages.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
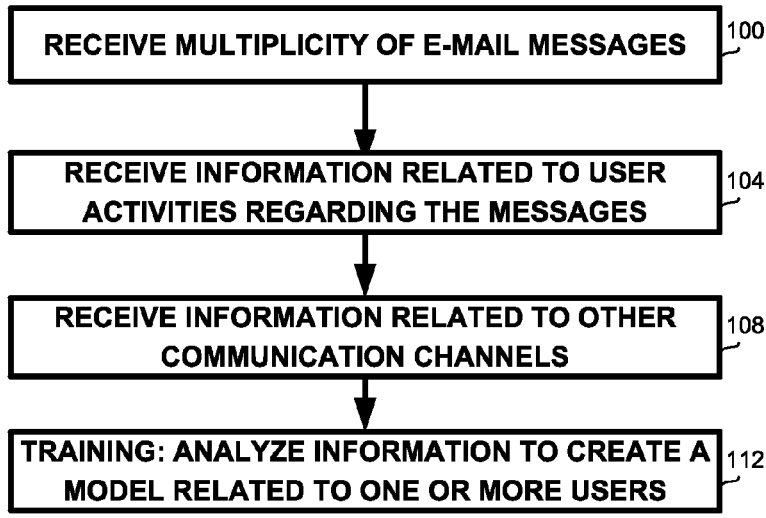
FIG. 1 shows a flowchart diagram of a method for creating a model related to one or more mail users, in accordance with some exemplary embodiments of the disclosed subject matter.

In the description below, the terms "mail", "e-mail", "email", "message" or similar terms are used interchangeably and are not limited to a specific protocol. Exemplary protocols for transmitting such messages may include Simple Mail Transfer Protocol (SMTP), Post Office Protocol (POP3), Internet Message Access Protocol (IMAP), Short Message Service (SMS) or the like. Such terms generally relate to an electronic communication that may be transmitted by an author to one or more intended recipients and may be consequently received by devices of such recipients.

One technical problem dealt with by the disclosed subject matter is the limited control e-mail users have over the incoming mail messages they are receiving. Incoming mails are usually sorted in accordance with one of a few predetermined and technical parameters, such as receiving time, sender, subject, or the like. However, these arrangements seldom reflect the real importance and priority of a mail message to the receiver. Such importance may often be affected by factors such as the message content; other recipients of the message; whom, what, and in what order any one or more of the other recipients did with the message, for example replied, forwarded it, deleted it, or the like; the length of the message; the urgency of the message which may also be affected by other people's activities, or the like. In addition, the priority of each incoming message to a receiving user may depend on the state of the particular user.

It will be appreciated that the importance and priority may be required to be dynamic, i.e., may change over time, as a result of the activities of the receiver or of other people related to one or more mail messages. For example, if it is determined that a mail is important and urgent, it may be required to associate it with high priority in the user's list, while if it is determined that the mail is no longer relevant or urgent, or that other mails are more urgent, its priority may be reduced. In some cases, emails may become more or less important when other recipients act upon them, depending on the context (e.g., answering an urgent question becomes less important if someone had already answer it; on the other hand, if all other recipients had already responded to an email, it may become more urgent that the user respond to it and not let everyone wait for her response).

Another technical problem relates to the limited control e-mail senders have over the mails they send, in particular when addressing a multiplicity of recipients. Some recipients prefer receiving long and elaborate e-mails with all required details, while others prefer a short summary; some recipients may prefer to be contacted by other methods, such as instant messaging, chat, text messages, via messaging services of social networks, or the like; some receivers prefer receiving e-mails at certain hours over other hours; or the like. However, a sender, after having composed an e-mail, simply hits send, and all receivers receive it almost instantaneously or as soon as they connect, and as an e-mail message, which may be sub-optimal for one or more of them, and hence the response or actions taken may also be not as good or efficient.

Yet another technical problem relates to multiple e-mail users within an organization, taking part in related activities, without knowing one about the activities of the other and thus without cooperating. For example, people from different departments may be contacting the same potential customer, searching for the same or similar information, being interested in a common subject, or the like. Such lack of awareness and cooperation may lead to waste of time and attention resources, knowledge gaps, loss of potential business, winning business at lesser conditions, or the like.

One technical solution relates to employing one or more machine learning engines at an organization server level, which may collect information related to the clients' behavior as related to e-mail or other channels, processing the information for determining rules or other decision mechanisms, and applying them in one or more mail-related activities. The collected information may relate to the priorities of different mails to certain users, and how these priorities change in accordance with whether, what, when or how other people react to the same e-mails. Further information may relate to other communication channels, for example whether a specific user prefers and replies faster to instant messages than to e-mails, to hours at which users are more responsive, or the like. In some exemplary embodiments, the information used by the organization server may be collected from client devices utilized by users and tracking and monitoring their activity and habits.

In some embodiments, an e-mail user may have her incoming e-mails sorted in accordance with priorities related to urgency or importance, wherein the priorities may be affected by actions taken by other people within the organization, such as other addressees of one or more of the e-mails. The priorities may be determined dynamically and may thus be updated due to newly taken activities by the recipient or by others, elapsed time, or other factors. The user may then be able to relate to the e-mails in an effective way driven by the personal priority of the e-mail to the user, rather than by the generic metadata based sorting.

In some embodiments, an e-mail sender, after composing an e-mail, may receive one or more suggestions related to how the message should be sent to one or more addressees. For example, it may be suggested that delivery to a certain addressee is delayed to a certain hour, that a message to an addressee be sent via an alternative channel, that a message to an addressee be shortened or extended, or the like. In some embodiments, a message may be converted from one medium to another, and sent in a channel that supports the new format. For example, a message may be converted from text to audio or vice versa, form text to image or vice versa, or the like. In some embodiments, one or more suggestions may be carried out automatically, while in other embodiments the sender may have to approve the suggestion or act in accordance with it in order for the suggestion to take effect.

In further embodiments, the preferences of a user may be published, such that a user or another program can access them and act accordingly. In some exemplary embodiments, the user preference may be published in a non-human-readable manner so as to conserve some privacy of the user. Additionally or alternatively, the preference may be published to authorized devices, such as a server of an organization, or the like.

In some embodiments, the machine learning engine may mine information exchanged in mails or other communication channels within an organization, and may identify common interests to users within an organization, such as a customer or potential customer accessed by multiple users, a subject that different users are interested in, or the like, wherein the users are not cooperating on the subject, for example there is no e-mail exchange between the users related to the subject, with or without a third party being involved, or the like. In some embodiments, the engine may identify an expert on the subject, for example a user to whom multiple mails related to the subject are forwarded, or the like. The engine may form an interest group in which the relevant users may participate. A system receiving data from the learning engine may then suggest to the users to cooperate on the subject, to address an expert, to join a relevant group, or the like, thus enhancing cooperation to everyone's benefit.

One technical effect of the disclosure relates to a mail server or an associated engine obtaining data from the activities and behavior of one or more users, deducing rules or information, and applying the rules or using the information to enhance the behavior of the mail server or mail clients, or to suggesting to users how to benefit further end enhance the productivity and performance of their mail usage.

Referring now to FIG. 1, showing a flowchart diagram of a method for creating a model related to one or more mail users, in accordance with some embodiments of the disclosed subject matter.

On step 100, a multiplicity of e-mail messages may be received. In some exemplary embodiments, at least some of the messages are e-mails addressed to multiple addressees within an organization.

On step 104, a multiplicity of user actions and other information regarding said mails may be collected. For example, when a specific user replied to a mail; within a predetermined groups of people such as a team, how many and who replied to the mail and in what order; after which response did the chain of mail stop; when is a user more likely to respond to a mail; was a mail forwarded by one or more team members; does a user reply first to long or short mails; does the user reply first to the latest mails or the earlier ones; does a user often reply to a mail on which he is on the Carbon Copy (CC)-list or Blind Carbon Copy (BCC)-list, or the like.

On step 108, data related to other communication channels may be collected. For example, does a user reply first to e-mail messages, to chats or to messages in other communication channels; on what times is a user more likely to be responsive in which channels; or the like.

On training step 112, the collected data may be analyzed to create a model related to each user. The model may comprise a rule for determining one or more priority scores for mail messages, depending upon what any one or more of the other recipients did with the mail, for example replied, deleted, forwarded, or the like.

In some exemplary embodiments the model may be useful in determining for a mail message composed by the user, the preferred sending channels, times or other characteristics, depending on the recipients of the mail.

In some exemplary embodiments, additional rules, not necessarily determined by observing the user behavior may be added, or suggested to be added so as to be represented by the model.

The model may be used to determine a score for a mail, related to how the user handles similar mail, how other people handle the mail or similar mails, or the like.

The trained model may be stored on a server, but may also be stored on one or more of the clients' computers, such that it is available also when the computer is offline.

In some exemplary embodiments, the model may define different predicted scores/operations to the same e-mail in different client devices. For example, the model may predict that the user will ignore the e-mail in her mobile device and handle it in her desktop device. Additionally or alternatively, the model may provide the same e-mail with a low score in the mobile device and a high score in the desktop device.

In some embodiments, a model related to a user may be published, for example in a location accessible to the server or to multiple clients, such that other clients may access it when receiving a mail from the other user or sending mail to the other user. In some exemplary embodiments, the model may be published in a computer-readable manner that is not human readable. In some exemplary embodiments, access to a published model may require having a certificate. Additionally or alternatively, the published model may be encrypted, such as but not limited to using a key of the organization.

Figure 2:
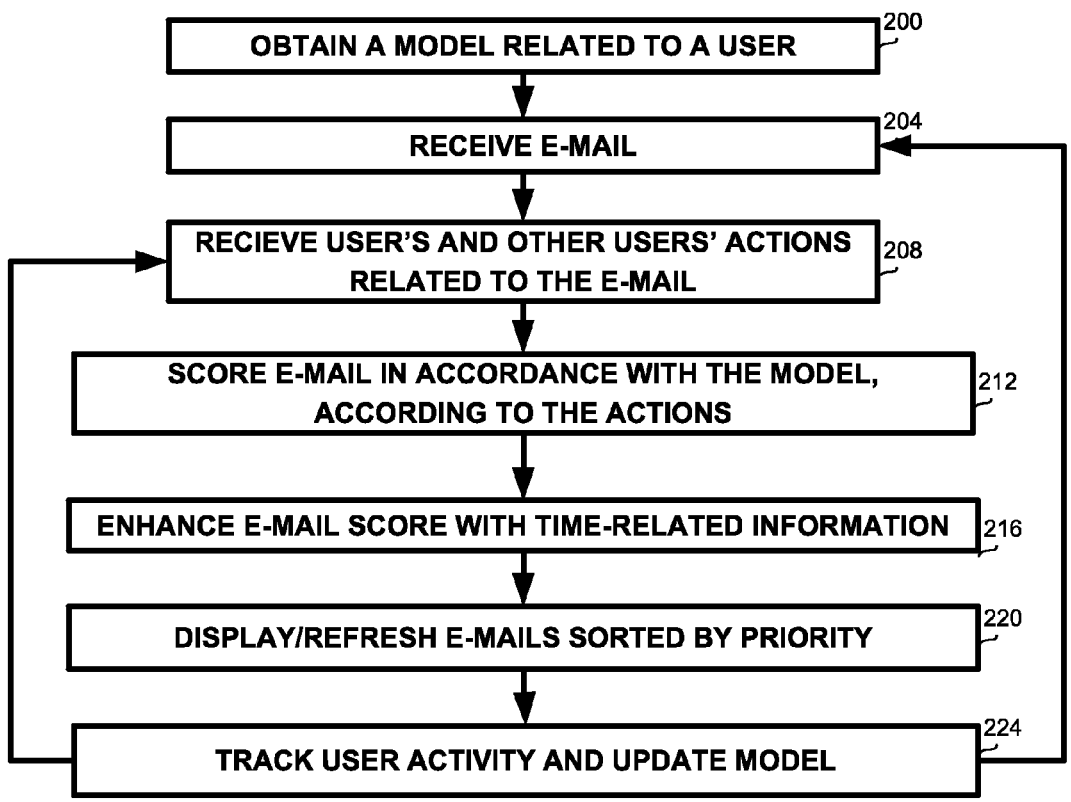
FIG. 2 shows a flowchart diagram of a method for ordering or prioritizing mail messages, in accordance with some exemplary embodiments of the disclosed subject matter.

Referring now to FIG. 2, showing a flowchart diagram of a method for ordering or prioritizing mail messages.

On step 200, a model related to the user's usage of e-mails may be obtained. The model may be obtained by training, for example as disclosed in association with FIG. 1 above, received from a third party, or the like. The model may comprise one or more rules that may be applied to a mail message to obtain a priority score.

In some exemplary embodiments, the model may be obtained by a client device executing client software (e.g., e-mail client program) from a server. Additionally or alternatively, the model may be retained locally in the client and obtained therefrom. In some exemplary embodiments, updates to the model may be received periodically, such as every 3 hours, once a day, once a week, or the like, and may be received from a server aggregating information obtained from a plurality of different clients of the same user (e.g., desktop client, mobile client, or the like).

On step 204, an e-mail message may be received. In some exemplary embodiments, the e-mail may be received from an e-mail server. In some exemplary embodiments, the e-mail is addressed to the user, such as by including the user in the "To" list, in the "CC" list, in the "BCC" list, or the like.

On step 208, the user's actions and other users' actions may be received, for example whether the user or other users read the message, forwarded the message, replied to the message, deleted the message, saved the message, or the like. The actions of the user and other users may be monitored by the client devices used by each such user.

On step 212, the e-mail may be scored to obtain a priority score. In some exemplary embodiments, the score may be determined by applying the model to the e-mail. In some exemplary embodiments, one or more rules may be used to compute the score. In some cases, the rules may be defined in the model (e.g., determined based on past behavior of the user or other users) or externally to the model. In some exemplary embodiments, an initial score may be computed and then modified based on rules which relate to activities by one or more other recipients of the same e-mail.

The following are non-exhaustive examples of rules that may either be automatically determined based on past behavior or added to be applied regardless on past activities:

First Response priority drop: the first response to a question in an e-mail directed to a group of recipients asking for information, may reduce the e-mail's priority for the rest of the group.

Last response priority increase: being part of a minority group that didn't respond to an e-mail that included a request for information or action from a group, may increase that specific e-mail's priority. For example if an e-mail asking for feedback was sent to a group and almost everyone replied, then typically a user wouldn't like to be the last one not answering, so the e-mail may be assigned high priority.

Be the first to respond: if a sender is important to the user, such as in case when a manager of a user asks a question, the e-mail may be assigned high priority as long as no one has answered, such that the user is encouraged to be the first to respond. Once a response has been provided, the priority may drop for other recipients.

Conversation atmosphere: tracking the conversation rating and adjusting the priority according to the other members' behavior, for example dropping the priority if the user is more active than other members in the mail chain, raise the priority if other members are more responsive, to ensure the user is not missing the decision making process, or the like.

Sender effort meter: consider in the scoring process of an e-mail the effort that was invested in composing the e-mail. The longer or more elaborate the e-mail, the higher is the assigned priority.

Forwarded e-mail: for example in the situation of in which an e-mail was sent to a group and forwarded to another user by one of the group members: if the e-mail chain is very active and has lots of correspondence, then the subject may be interesting or important and the mail may be assigned high priority. Otherwise the mail may be for notification only and may be assigned low priority.

On step 216, the score may be enhanced with time-related information or preferences. For example, e-mails may be grouped according to optimal time/importance tradeoff, wherein the score may be determined also in accordance with the user's available time. The system may provide a prediction of an optimal set of e-mails that the user can process in a defined time range, while taking into consideration the importance scoring of the e-mails and the predicted duration that it would take the user to process them. For example:

Quick e-mail: if the system's prediction algorithm predicts that an e-mail can be handled very fast relatively to the other e-mails, it may increase the e-mail's priority. This estimation can be based on the e-mail's characteristics, e.g., length, complexity, attachments, or the like, by learning from the time it took other users that received the e-mail to respond. Quick e-mail may fit a usage scenario of rapidly answering e-mails in the limited time between meetings.

Mid duration e-mails: e-mails that can fit a time planned for reviewing e-mails having medium or higher importance.

Mailbox cleanup state: the system may group e-mails with similar priority in order to allow the user to clean up the mailbox from older and less important e-mails. Such a scenario can fit a long ride to work, flights, train travels, or the like.

The time available for the user may be determined based also on the user's calendar for determining the time until the user's next meeting, determining from other e-mails that the user is going on a flight, determining by studying the user's habits that the user is on the way home, or the like. In some exemplary embodiments, location-based services may be utilized to determine the location of the user, so as to determine the amount of time she has and/or is willing to invest. For example, during commute to or from work, the user may have time to review e-mails. As another example, when the user is at her home, it may be assumed she is unlikely to invest substantial time in handling e-mails and only highest priority e-mail may be displayed to the user.

On step 220, the e-mails may be displayed or refreshed to reflect the current priorities of the e-mail items, as may have changed since the previous time it was displayed, for example due to actions by other recipients of one or more e-mails. In some exemplary embodiments, the display may be dynamically modified after receipt of the e-mail by the e-mail client of the user, such as in view of actions performed by other recipients of the same e-mail. Additionally or alternatively, the display may be modified in view of actions of the user relating to other e-mails, such as deleting, reading, filing, replying, forwarding, or similar actions on one or more additional e-mails. Such actions may lead to a modification of the model, which may, in turn, cause the priority to be modified.

On step 224 actions and activities related to one or more e-mails may be tracked. In some exemplary embodiments, based on additional actions, the model related to the user may be enhanced or updated. Additionally or alternatively, actions by other users may be tracked and their respective model may be updated. In some exemplary embodiments, based on new user actions with respect to the e-mail—either of the user or of other recipients—that occurred after the e-mail was received (Step 204) and potentially after the e-mail was displayed (Step 220), Steps 208-220 may be performed to determine a modified display that takes into account such post-receipt and post-display actions.

Figure 3:
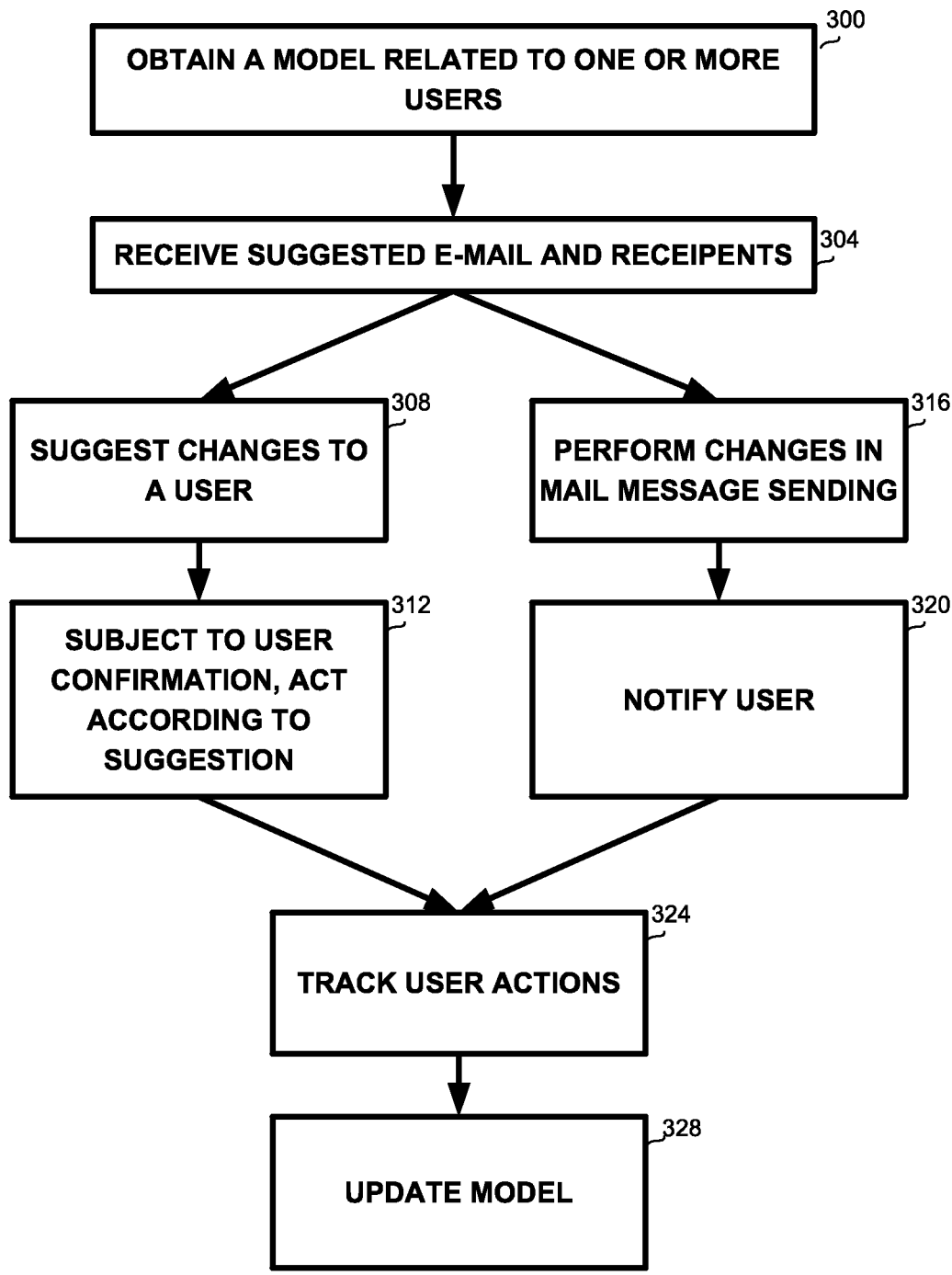
FIG. 3 shows a flowchart diagram of a method for enhancing message sending, in accordance with some exemplary embodiments of the disclosed subject matter.

Referring now to FIG. 3, showing a flowchart diagram of a method for enhancing message sending, in accordance with some embodiments of the disclosed subject matter.

On step 300, a model related to the user's usage of e-mails, or to one or more users from within the organization may be obtained. The model may be determined by training, for example as disclosed in association with FIG. 1 above. In some exemplary embodiments, the model may be retrieved from a local or remote storage device, received from a third party, or the like. The model may refer also to the preferences of users within the organization, including e-mail handling preferred times, preferred communication channels, or the like.

On step 304, an e-mail message composed by the user, which has not been sent yet (e.g., ready-to-send draft), may be received. In other embodiments, the message has been sent by the user and received by a server (e.g., e-mail server) but not dispatched to the recipients yet.

On step 308, the system may suggest to the sender changes in the e-mail or in its sending manner. The changes may include, for example, delaying the sending to one or more recipients until a time at which he is more likely to handle it, suggest sending the information in alternative channel (e.g., instant messaging or social network message instead of via e-mail), or the like. In some embodiments, the system may suggest to shorten the mail since one or more recipients are unlikely to relate to long mails, to check whether the language in which the mail is written is acceptable by the recipients and suggest translations otherwise, or the like. In some embodiments, it may be suggested to convert the message to another medium and send in the new medium for example from text to audio or vice versa (e.g., using a speech to text module or text to speech synthesizer), or the like. In some exemplary embodiments, there may be different suggestions to different recipients, including contradicting suggestions (e.g., delay transmission to one recipient and send instantly to another; using different communication channels for different recipients; suggesting shortening the e-mail for one recipient and elaborating for another; etc.), thereby suggesting sending the e-mail in different manners to at least one recipient, such that different recipients may receive the e-mail in different manners.

On step 312, subject to the mail creator's approval, the message may be sent as suggested. Otherwise the message may be sent as originally drafted.

On step 316, which may be performed once the user has gained confidence in the system, the system may automatically send the message in an alternative way as disclosed above, such as at a different hour or a different channel to at least one recipient in accordance with the system selection, and on step 320 the user may receive a notification to that matter.

Thus, the system may perform the suggestion and may send the message in a different manner such as a different time or communication channel, wherein this may be subject to user's approval, which may be general or specific to the particular message. Additionally or alternatively, no user approval may be required and the suggestions may be implemented automatically. In one example, the suggestions may be implemented automatically based on the recipient. For example, the CEO of an organization may require the suggestions to be automatically implemented thereby ensuring every member of the organization communicates with her in the most effective manner.

On step 324, the user's actions, such as acceptance of the suggestion, changes to the mail following the system's suggestions, or the like may be tracked, and on step 328 the user's model may be updated based on the tracked actions.

It will be appreciated that the methods of FIG. 2 and FIG. 3 may be performed wherein the system is part of or associated with the mail client, for example as a plugin installed thereon. In such embodiments, the models of multiple users may be provided to the sending user's e-mail client, to consider upon demand or when the other person is a potential receiver of a mail. In other embodiments, the models may be accessible only to the server, and the suggestions or decisions may be taken by the server when addressed by a client, for example when the mailbox is to be displayed or when sending a mail message.

Figure 4:
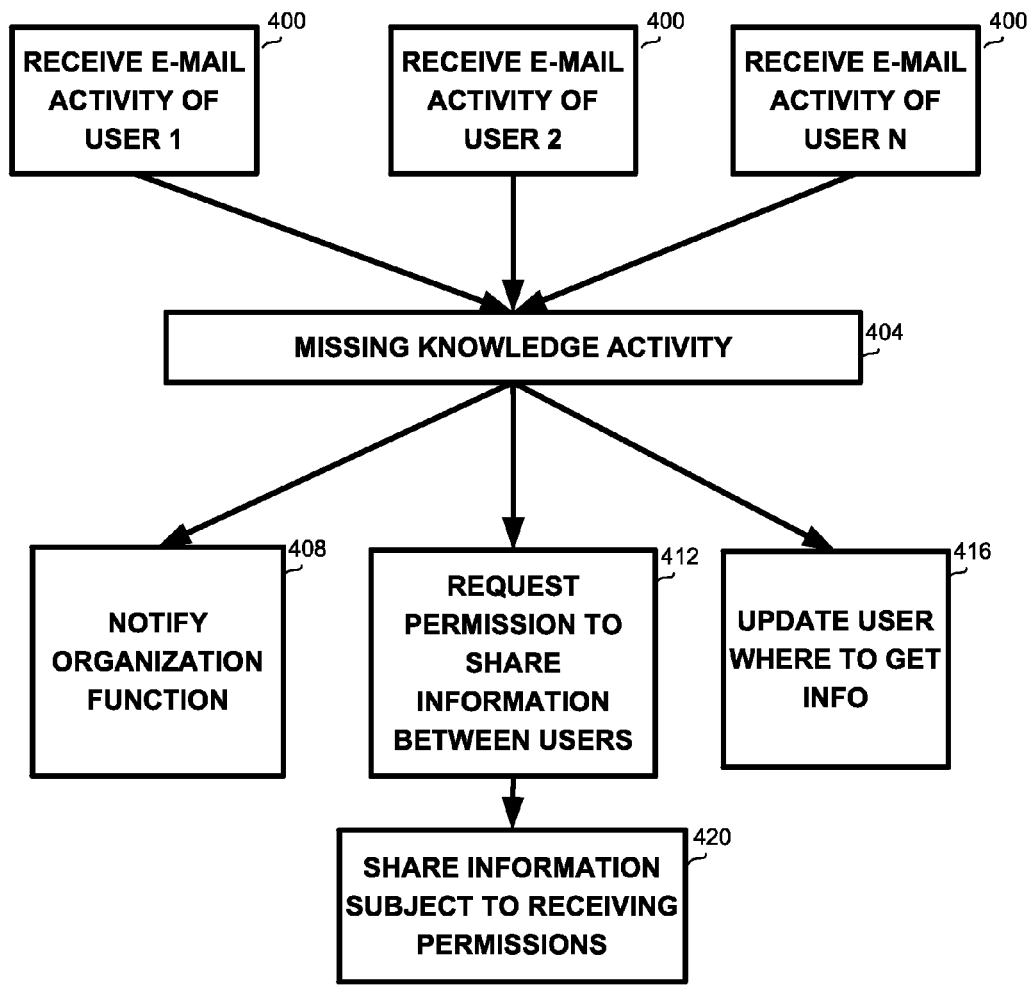
FIG. 4 shows a flowchart diagram of a method for knowledge gaps completion in communication systems, in accordance with some exemplary embodiments of the disclosed subject matter.

Referring now to FIG. 4, showing a flowchart diagram of a method for knowledge gaps completion in communication systems, in accordance with some embodiments of the disclosed subject matter.

On step 400, details of communication activity of one or more users within an organization may be received. The details may include the communication channel, the recipient, the content of the communication, or the like. For example, the communication may include one or more e-mails, chats, instant messaging, text messages, or the like. The communication details may be collected over a period of time, such as a day, a week, or the like.

On step 404, missing knowledge analysis may be performed. Since the system has visibility to multiple or all users in the organization, the system may analyze e-mails or other communications and may track cases when two or more people are working on or with the same information but are likely to be unaware of each other, or at least unaware that they are interested in the same subject.

An action can be taken once the analysis detects such a case, for example communicating with the same customer, mastering the same skill, sharing the same hobby, or the like.

The system can scan different properties of each communication message and capture them for the analysis process. The properties may include properties, such as but not limited to the following properties: recipient, for example recipients external to the organization, recipients external to the business or geographic unit, or the like; mail subject, for example proposal, query for information, update on an event, or the like; mail body, for example identifying discussions related to customer or vendor relationship, identifying discussions related to a specific field of knowledge, best practices, pitfalls, product defects, support issues, organization procedures, hobbies or the like; communication time and date.

For each user, the system can maintain any one or more of the following:

Relationship information structure comprising: recipient relationship containing typical internal and external mailing relationship, including their type such as customers, vendors, peers, etc., communication frequency or the like;

Skill information, including skills related to the user's role, informal skills, estimated skill level, which may be estimated, for example if the user is being queried multiple times about a specific subject and repeatedly answers without further routing the query;

Hobbies or fields of interest not related to the user's job, obtained for example by identifying mail correspondence regarding specific hobbies. The mails may be identified by comparing against a list of hobbies, by off hours event times, where e-mails relate to external applications such as sports or navigation applications, or the like.

During missing knowledge analysis step 404, the system may analyze which users are sharing common interest or are performing similar activities, potentially without knowing or relating to each other.

For example, the system may identify users with common field of expertise; detect and map experts at certain fields by analysis of questions directed to them from different sources that are being answered; analyze discussions and updates being generated by the users; detecting users that distribute best practices; detecting pitfalls alerts being sent from between users; detecting users that receive e-mails about posts at blogs of social networks with certain field of expertise, or the like.

The system may realize if there is no connection between the users by detecting no recent communication exchange therebetween, or no recent communication exchange therebetween regarding the common subject.

Once the missing relations between users regarding certain subjects are determined, one or more of the actions that are depicted in FIG. 4 may be taken.

In some exemplary embodiments, missing knowledge analysis may be based not merely on an existence of connectivity between groups of users (e.g., connections in a graph representing communication) but also on the context of the communication such as whether a communication message was sent from user X to user Y to request information from user Y or to spread information of user X (or potentially spread information received by user X, directly or indirectly, from user Z). Such analysis may be based on the content of the communication messages and may provide meaningful insights into the organization's key knowledge base. In some exemplary embodiments, a user may not be an expert but may spread information received from experts she is communication with. Identifying the experts themselves and not just the hubs of information may be useful to the organization. In some exemplary embodiments, an e-mail sent to an expert in which the expert is asked about his expertise may be given higher priority in the expert's inbox. Additionally or alternatively, in case the expert has unique expertise, the priority may be even higher.

On step 408, an organization function may be notified, for example a marketing department for subjects related to common customers. The message may relate to the missing connection, to allow rapid treatment or lesson learning. It will be appreciated that messages may be sent to a predetermined mailbox regarding subjects not specifically associated with a known function.

On step 412, a user searching for information may be notified where or from whom such information may be obtained.

On step 416, the system may request permission from two or more users to share information with other users. The system can send an e-mail to each user asking if they would like to be connected. Alternatively, the system may give the user optional privacy settings as to which information to share with which user.

On step 420, subject to receiving the permissions from the two or more users, the information may be shared, the users' details may be provided to the other users, or the like. For example, the system may take an action such as sending an introduction mail explaining the common knowledge or interest, informing a specific person in the company etc.

Figure 5:
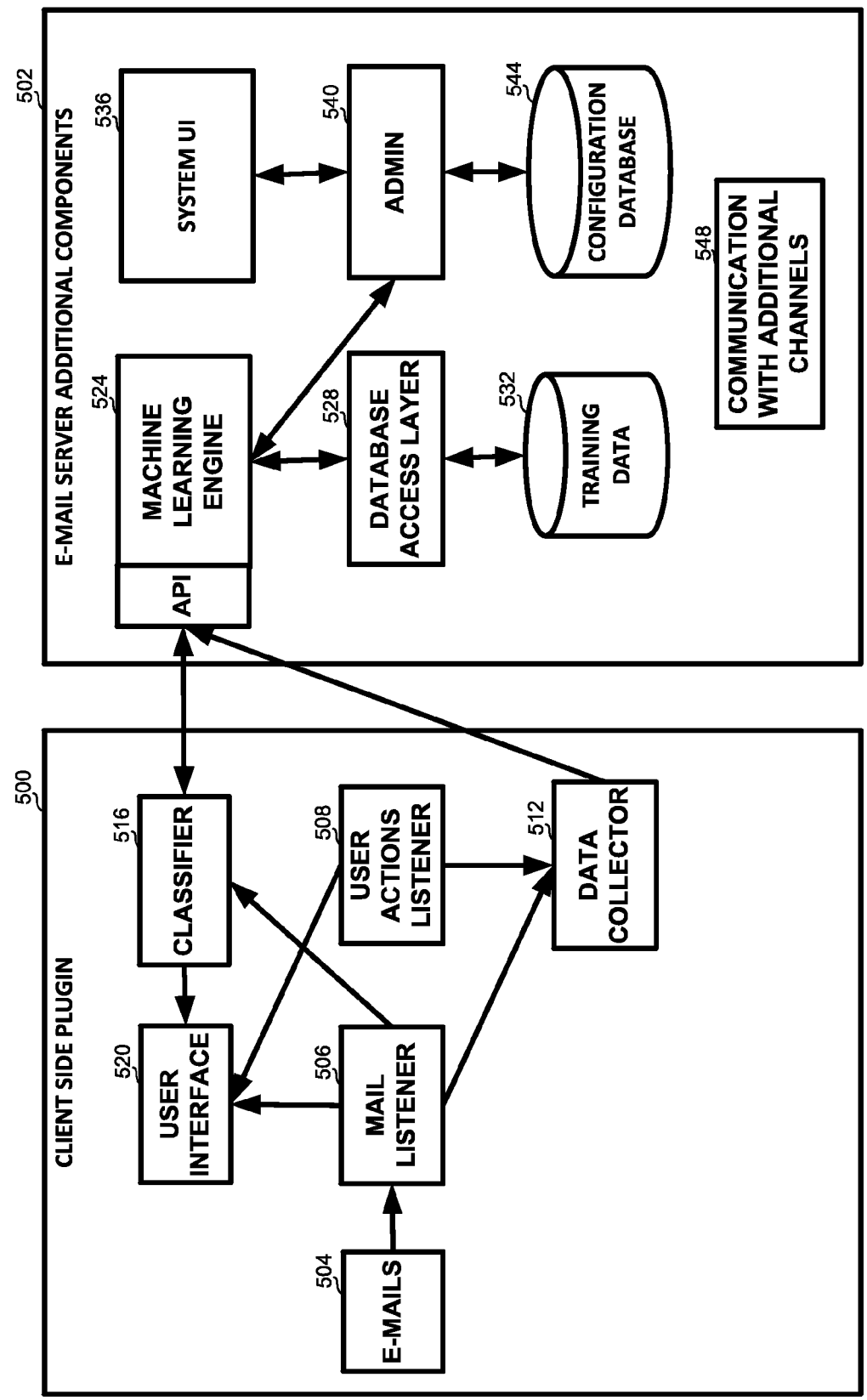
FIG. 5 shows a schematic block diagram of a system for e-mail or other communication enhancement within an organization, in accordance with some exemplary embodiments of the disclosed subject matter.

Referring now to FIG. 5, showing a schematic block diagram of a system for e-mail or other communication enhancement within an organization, in accordance with some embodiments of the disclosed subject matter.

The system generally comprises client side components 500 and server additional components 502.

In some embodiments, server additional components 502 receive information related to activities of a multiplicity of users within an organization. Based on these activities the system may change the manner at which a user sends messages to other users, or may assign a priority to one or more messages received by the user.

Client side components 500 may be implemented as a plugin added to a communication client such as an e-mail client, as part of a specific communication client, as a separate executable, or the like. It will be appreciated that client side components 500 are not limited to e-mails and may be incorporated into a client program of any communication channel.

Client side components 500 may comprise user interface 520, for displaying to a user the regular communication options, as well as additional features, such as messages sorted in accordance with dynamic priorities, receiving suggestions to send messages in alternative times or manners, or the like. In some exemplary embodiments, user interface 520 may be responsive to user selection indicating her availability status, such as "on the run", "inbox cleanup", "important only", or the like, and may prioritize or hide/display messages accordingly.

Client side components 500 may receive communication messages 504 such as e-mails, which may be received by message listener 506. Client side components 500 may also include user actions listener 508, which may monitor for actions by the user, such as composing messages, looking for people, replying to messages, or the like. Information from message listener 506 and user actions listener 508 may be provided to user interface 520 and reflected in a display.

The information may also be provided to data collector 512 that collects the data and may transmit it to server additional components 502.

Server additional components 502 may be implemented as additions to an e-mail server or another communication server, as a separate program or application, or the like.

Server additional components 502 may comprise machine learning engine 524, having an Application Program Interface (API), for receiving information collected from one or more client systems and providing responses to queries by the client systems.

Server additional components 502 may comprise database access layer 528 connecting to database 532, database 532 comprising for example models and training data upon which models are determined.

Server additional components 502 may also comprise system user interface 536 for providing to a user such as a system administrator, content specialist, or others, information about the gathered communication messages, the volume of messages processed, the formed connections, the models, or the like.

Server additional components 502 may further comprise administration component 540 for managing users, activities, or the like, and configuration database 544 for storing and retrieving user configurations, matching configurations, or the like.

Server additional components 502 may further comprise communication with additional channels component 548, for receiving information related to users' activities in various communication systems such as instant messaging, text messaging, social networks or the like.

Classifier 516 of client side components 500 may address machine learning engine 524 for receiving a score to be associated with a mail message, which score may take into account activities of other users within the organization as related to the message, and as detailed above, and may be used for displaying the user's messages according to their priorities. In some alternative embodiments, machine learning engine 524 may provide classifier 516 with a predictor, such as a formula. Incoming mails or composed mails may be analyzed by extracting terms, and the formula may be applied to the terms or to meta data of the mails to obtain a priority score, upon which the mail is displayed among other mails. In some exemplary embodiments, machine learning engine 524 may determine the model and provide the model to classifier 516 to be applied. Additionally or alternatively, classifier 516 may implement internally a machine learning engine instead of or in addition to addressing machine learning engine 524. In some exemplary embodiments, the disclosed subject matter may implement supervised learning or unsupervised learning.

In some exemplary embodiments, data collector 512 may provide information related to the user's activities to machine learning engine 524 for further updating scores of messages of one or more other users based on the activity of the user.

It will be appreciated that machine learning engine 524 may comprise further components, for example a component for scanning messages of multiple users and trying to find common subjects, as described in association with FIG. 4 above, and further API functions which one or more clients may address.

Figure 6:
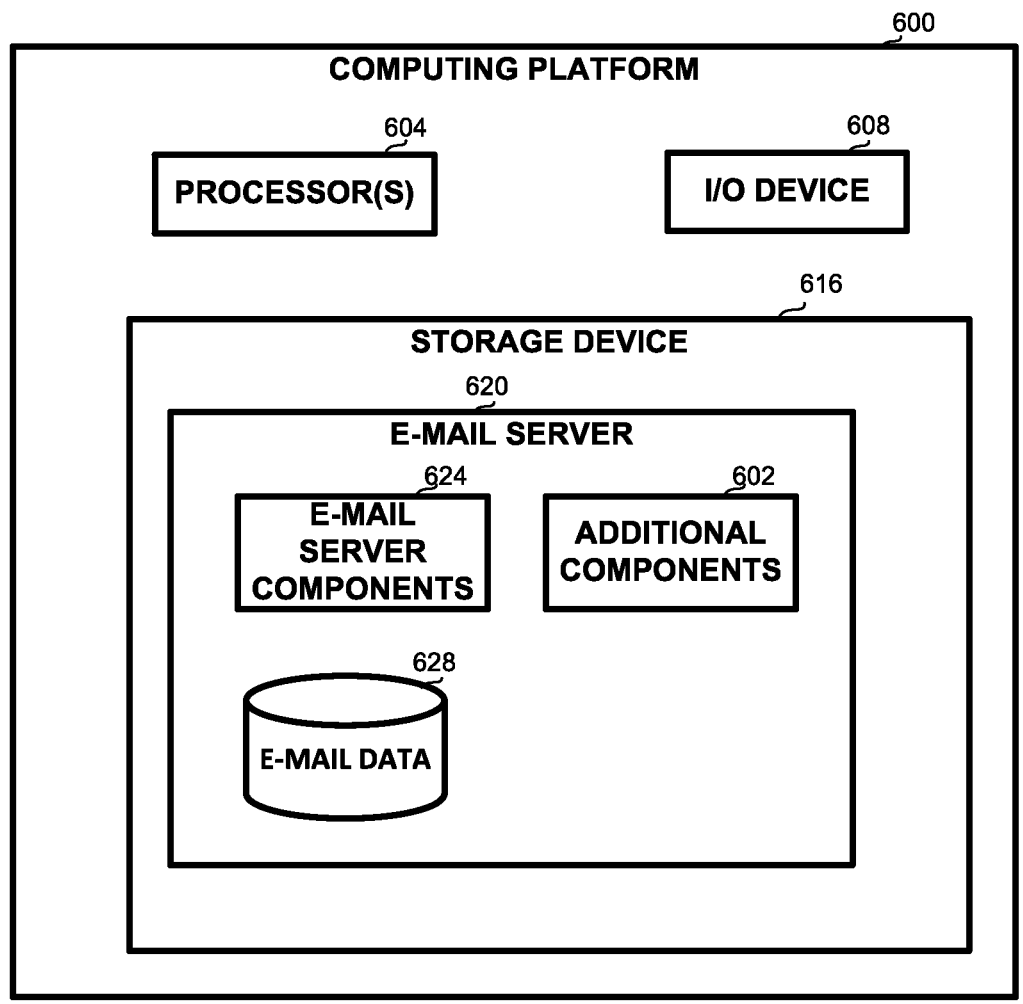
FIG. 6 is a schematic block diagram of a computing platform executing a mail server, in accordance with some exemplary embodiments of the disclosed subject matter.

Referring now to FIG. 6 showing a schematic block diagram of a computing platform executing a mail server in accordance with the disclosure. It will be appreciated, however, that the disclosure is not limited to a mail server and may also be applied to other communication servers.

In some exemplary embodiments, the apparatus may be implemented as computing platform 600 such as a server, a desktop computer, a mobile computer, or the like.

Computing platform 600 may comprise one or more processor(s) 604. Processor 604 may be a Central Processing Unit (CPU), a microprocessor, an electronic circuit, an Integrated Circuit (IC) or the like. Processor 604 may be utilized to perform computations required by the apparatus 300 or any of it subcomponents.

In some exemplary embodiments of the disclosed subject matter, Computing platform 600 may comprise an Input/Output (I/O) device 608 such as a display, a pointing device, a keyboard, a touch screen, or the like. I/O device 608 may be utilized to provide output to and receive input from a user.

In some exemplary embodiments, computing platform 600 may comprise a storage device 612. Storage device 612 may be a hard disk drive, a Flash disk, a Random Access Memory (RAM), a memory chip, or the like. In some exemplary embodiments, storage device 612 may retain program code operative to cause the processor 604 to perform acts associated with any of the subcomponents of computing platform 600. The components detailed below may be implemented as one or more sets of interrelated computer instructions, executed for example by processor 604 or by another processor. The components may be arranged as one or more executable files, dynamic libraries, static libraries, methods, functions, services, or the like, programmed in any programming language and under any computing environment.

Storage device 612 may store e-mail server components 612, for managing e-mail activities within an organization. E-mail server components 612 may comprise conventional e-mail server components 624, as conventionally implemented. E-mail server components 612 may further comprise additional components 502, for providing organization-wise features such as described in association with FIGS. 1-4 above.

E-mail server components 612 may further store or be in communication with e-mail database 628, storing e-mails and results for further processing as described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a communication message transmitted to a user and at least one other recipient;
   providing to the user a display of a set of communication messages comprising the communication message;
   after said providing, receiving information of actions related to the communication message performed by the at least one other recipient of the communication message;
   scoring the communication message based on the actions to obtain a priority; and
   modifying the display based on the priority, whereby the display is modified dynamically upon an additional action of the at least one of the other recipients of the communication message;
   wherein the priority is based also on a factor selected from the group consisting of: a time slot available to the user to review the communication message, a sender of the communication message, a length of the communication message, and a subject of the communication message;
   wherein said scoring is also based on a model associated with the user, wherein the model is determined based on past actions by the user when receiving communication messages.

2. The method of claim 1, wherein at least one of the actions performed by the at least one other recipient is selected from the group consisting of: reading the communication message; filing the communication message; replying to the communication message, forwarding the communication message and deleting the communication message.

3. The method of claim 1, wherein the user is associated with an organization, and wherein the at least one other recipient is associated with the organization.

4. The method of claim 1, wherein the user is associated with an organization; wherein the method further publishing, exclusively within the organization, the model to be used for one or more users of the organization, without providing the one or more users direct access to the model.

5. A computer program product comprising a non-transitory computer readable storage medium retaining program instructions, which program instructions when read by a processor, cause the processor to perform the method of claim 1.

6. A computerized apparatus having a processor, the processor being adapted to perform the steps of:
   receiving a communication message transmitted to a user and at least one other recipient;
   providing to the user a display of a set of communication messages comprising the communication message;
   after said providing, receiving information of actions related to the communication message performed by the at least one other recipient of the communication message;
   scoring the communication message based on the actions to obtain a priority; and
   modifying the display based on the priority, whereby the display is modified dynamically upon an additional action of the at least one of the other recipients of the communication message;
   wherein the priority is based also on a factor selected from the group consisting of: a time slot available to the user to review the communication message, a sender of the communication message, a length of the communication message, and a subject of the communication message; wherein said scoring is also based on a model associated with the user, wherein the model is determined based on past actions by the user when receiving communication messages.

7. The apparatus of claim 6, wherein at least one of the actions performed by the at least one other recipient is selected from the group consisting of: reading the communication message; filing the communication message; replying to the communication message, forwarding the communication message and deleting the communication message.

* * * * *